United States Patent [19]

Norton

[11] Patent Number: 5,244,688
[45] Date of Patent: Sep. 14, 1993

[54] FAT-CONTAINING DISPERSION AND METHOD OF PREPARING SUCH DISPERSION

[75] Inventor: Ian T. Norton, Rushden, Great Britain

[73] Assignee: Van den Bergh Foods Co., Division of Conopco, Inc., Lisle, Ill.

[21] Appl. No.: 616,138

[22] Filed: Nov. 20, 1990

[30] Foreign Application Priority Data

Nov. 22, 1989 [EP] European Pat. Off. ......... 89202964.6
May 4, 1990 [EP] European Pat. Off. ......... 90201123.8

[51] Int. Cl.$^5$ .............................................. A23D 7/00
[52] U.S. Cl. ..................................... 426/602; 426/601
[58] Field of Search ........................ 426/602, 804, 601

[56] References Cited

U.S. PATENT DOCUMENTS

| | | |
|---|---|---|
| 4,273,795 | 6/1981 | Bosco .................................. 426/804 |
| 4,279,941 | 7/1981 | Bosco et al. . |
| 4,536,408 | 8/1985 | Morehouse et al. . |
| 4,835,002 | 5/1989 | Wolf .................................... 426/602 |
| 4,883,681 | 11/1989 | Ernsting .............................. 426/602 |
| 4,943,445 | 7/1990 | Norton ................................ 426/602 |
| 4,956,193 | 9/1990 | Cain et al. ........................... 426/602 |

FOREIGN PATENT DOCUMENTS 237120 9/1987 European Pat. Off. .
279498 8/1988 European Pat. Off. .

*Primary Examiner*—Carolyn Paden
*Attorney, Agent, or Firm*—A. Kate Huffman

[57] ABSTRACT

The present invention is concerned with a stable edible dispersion comprising 95 to 86% by weight of an aqueous phase and 5 to 14% by weight of a continuous fat phase having and $N_{20}$-value of at least 5. It is surprising that, provided suitable processing conditions are applied and a seeding component is employed, stable dispersions containing less than 14% by weight of a continuous fat phase having an $N_{20}$-value of at least 5, and more than 86% by weight of an aqueous phase can be prepared. Another aspect of the present invention is a method of preparing a dispersion comprising 95 to 86% of an aqueous phase and 5 to 14% by weight of a continuous fat phase having an $N_{20}$-value of at least 5, said method comprising cooling and working an emulsion of oil and water, the oil comprising 0.1-4%, by weight of the oil, of a solid seeding component.

2 Claims, No Drawings

FAT-CONTAINING DISPERSION AND METHOD OF PREPARING SUCH DISPERSION

BACKGROUND OF THE INVENTION

The present invention is concerned with a stable water and oil containing edible dispersion of reduced fat content. Another aspect of the present invention is a method of preparing a water and oil containing dispersion of reduced fat content.

Since the early seventies there has been a sharp increase in demand for food products of low fat content. As a result of this increasing demand, spreads were developed which, unlike butter and margarine, contain substantially less than 80% by weight of fat. At present, most commercially available low-calorie spreads have a fat content of about 40% by weight.

Research meanwhile has been continued so as to develop products of even lower fat content. In European patent application No. 0 237 120, for instance, spreads comprising less than 35 wt.% fat are described. The examples of the European application actually disclose spreads comprising from 15-25wt.% of a continuous fat phase.

Spreads having fat contents below 15% by weight have also been described in the prior art. German patent application No. 3 043 655 corresponding to U.S. Pat. Nos. 4,279,941 and 4,273,795 discloses a spread comprising about 10% by weight of a dispersed oil phase.

The man skilled in the art is inclined to deem it impossible to prepare dispersions comprising less than 14% by weight of a continuous fat phase containing a substantial amount of solid fat at room temperature, as he would expect that only water-continuous dispersions can be obtained at such low fat levels and with such fat blends.

We have surprisingly found that, provided suitable processing conditions are employed, stable dispersions containing less than 14% by weight of a continuous fat phase having an $N_{20}$-value of at least 5, and more than 86% by weight of an aqueous phase can be prepared. Thus in a first aspect the present invention is directed to a stable edible dispersion comprising 95 to 86% by weight of an aqueous phase and 5 to 14% by weight of a continuous fat phase having an $N_{20}$-value of at least 5. According to a very preferred embodiment fo the invention the present dispersion contains at most 13% by weight of the continuous fat phase.

Here by a stable dispersion is meant a dispersion which after preparation can be kept for days at a temperature of 2°-20° C., under quiescent conditions, without any substantial water separation or phase inversion being observed. The term dispersion as used in this application not only encompasses fat continuous compositions comprising a discontinuous aqueous phase, but also compositions comprising a continuous aqueous phase, i.e. so called bi-continuous compositions.

Throughout this application the terms oil and fat are used interchangeably. They are meant to include triglycerides such as soybean oil, sunflower oil, palm oil, fish oil, rapeseed oil. coconut oil, chemically and/or physically modified products such as hydrogenated, fractionated and/or interesterified triglyceride mixtures and mixtures of two or more thereof, as well as edible substances that are physically similar to triglycerides, such as poly fatty acid esters of mono- or disaccharides and that may be used as replacement for, or in admixture with, triglyceride oil.

For many years various companies have invested considerable effort in developing very low fat spreads, so far only yielding water-continuous spreads and fat-continuous spreads comprising at least 15% by weight of fat. Due to a better understanding of the control of crystallization and, in case a gelling aqueous phase is used, control of gelation during processing, we have succeeded in preparing fat-continuous dispersions of extremely low fat content.

SUMMARY OF THE INVENTION

We have found that the crystallization of the fat phase during the preparation of the present dispersion largely determines the quality and nature of the final dispersion, and also that said crystallization can be controlled effectively through the utilization of a seeding component. Throughout this application the term seeding component indicates a component, preferably a glyceride composition, that either crystallizes earlier than the bulk of triglycerides of the fat phase, or is already in a crystalline form when incorporated in the liquid fat phase during the manufacturing process. Suitable seeding components are mono-, di- and/or triglyceride compositions.

Preferably the seeding component employed crystallizes earlier than the bulk of triglycerides as may be established by continuously monitoring the solids content of the fat blend constituting the fat phase containing the seeding component, while rapidly cooling down under quiescent conditions. In case the solid content upon cooling down increases suddenly, then remains relatively constant at a low solids level before rising sharply again, the first increase may be attributed to a seeding component and the second increase to the bulk of triglycerides.

The presence of a solid seeding component in the fat phase, upon cooling initiates crystallization of the bulk of triglycerides at a relatively high temperature and into a relatively stable high melting polymorph, as will be explained later on in this application. Since only relatively small amounts of seeding component are required to prepare the present stable fat continuous dispersion, preferably, the present dispersion contains 0.1-4%, by weight of the continuous fat phase, of an oil-soluble solid seeding component.

According to a very preferred embodiment of the invention the oil-soluble seeding component consists of mono- and/or diglycerides. Preferably the seeding component is relatively high melting, i.e. has a slip melting point of at least 40° C., more preferably of at least 50° C.

DESCRIPTION OF THE PREFERRED EMBODIMENTS

The importance of crystallization control may be explained from the crystallization behaviour of the fat phase present in the water and oil emulsion that is subjected to deep cooling during the preparation of the present stable dispersion. Glycerides, when in their solid form, can exist in more than one crystalline form, some of which are relatively unstable. In general, one form is more stable than the others, though not necessarily the same form for each class of glyceride. By means of X-ray diffraction three distinct crystallization polymorphs have been identified in glycerides, and named beta, beta prime and alpha. Other crystallization polymorphs probably exist, but these do not need to be discussed here.

The alpha polymorph is the lowest melting form in which there is only partial order because of residual rotation of the aliphatic group. The alpha polymorph is an unstable polymorph obtained after rapid and deep cooling a liquid oil. In the manufacture of many fat-containing products a liquid oil containing composition is quickly and deeply cooled in scraped surface heat exchangers (A-units), resulting in the crystallization of part of the fat to the unstable alpha polymorph. Transition of the alpha polymorph to the more stable beta or beta prime polymorph usually takes place in stirred crystallizers (C-units) and/or resting tubes (B-units) and/or storage.

We have found that stable fat-continuous dispersions containing less than 14% by weight of fat can be prepared if processing conditions and/or product composition are tuned in such a manner that essentially no alpha-crystallization of the bulk of triglycerides is reached within the manufacturing process.

We have furthermore found that crystallization of the bulk of triglycerides in the fat phase, directly into the more stable beta or beta prime polymorph, is achieved by the incorporation of a seeding component, such as mono-, di- or triglycerides. The seeding component employed crystallizes before the bulk of triglycerides present in the dispersion, thereby producing small crystals which stabilize the water droplets in the fat continuous dispersion and which act as a seed source for the triglycerides.

Alternatively the seeding component may consist of precrystallized mono-, di- and/or triglycerides, as such solid crystals also act as a seed source for the bulk of triglycerides present in the fat phase. Although a seeding component is employed so as to prevent alpha-crystallization of the bulk of triglycerides, the seeding component itself may suitably be in the alpha-polymorph form.

The presence of a seeding component thus results in crystallization at higher temperatures, directly in the beta prime of beta form, and under high shear conditions gives secondary nucleation and small crystals. As a direct consequence of the crystallization at higher temperatures and into a more stable form, the triglyceride crystallization is slower and more controllable. Such slow and controlled crystallization is a prerequisite to the preparation of fat continuous dispersion comprising less than 14% by weight of fat and a non-gelling aqueous phase.

If a gelling aqueous phase is utilized, the preparation of the present dispersion preferably involves pre-gelation of the aqueous phase, i.e. gelation of said aqueous phase in the processing line rather than in the final emulsion after packaging. In particular if the aqueous phase used is slowly gelling, pre-gelation is effected by giving the cooled emulsion a relatively long residence time in the production line. An example of slowly gelling aqueous phase system is an aqueous gelatin solution.

We have found that stable water-in-oil dispersions can be prepared by cooling a gelling agent containing water-continuous composition to a temperature below the gel setting temperature for a sufficiently long period of time to allow the formation of a gel structure, subjecting said water-continuous composition to shear so as to convert it into small gelled aqueous beads and forming a fat-continuous dispersion. Preferably the gelling agent is slowly gelling, e.g. gelatin.

The latter approach has enabled the preparation of fat-continuous dispersion without the necessity of using a seeding component, e.g. by using monoglyceride at such a low concentration level that it crystallizes later than the triglyceride bulk. Consequently pre-gelation can be used to prepare fat-continuous dispersions containing mono- and/or diglycerides at limite concentration, e.g. the minimum concentration necessary for emulsification. According to a very preferred embodiment of the present invention the present dispersion contains a gel-forming aqueous phase and contains essentially no seeding component.

By the gel setting temperature as referred to in this application is meant the temperature at which, upon slowly cooling down a gelling agent containing aqueous composition, an ordered gel structure is formed. The gel setting temperature of an aqueous composition can be determined by heating the composition to above the gel melting point, splitting it up in a number of samples which are subsequently equilibrated, under quiescent conditions, for 15 minutes at different temperatures lying 1 centigrade apart, and putting a steel ball of about 1 mm diameter on each of the samples after equilibration. The samples are ordered in accordance with the temperature at which the samples were equilibrated, starting from the sample equilibrated at the highest temperature. The gel setting temperature is the equilibration temperature of the first sample through which the steel ball does not sink.

The melting temperature of a gel can suitably be measured using the following procedure: Pour a sample into a glass test tube and allow it to set fully at 5° C. Then place the tube in a water jacket connected to a programmable water bath. Place a steel ball, having a diameter of approximately 1 mm, on the surface of the sample and depress slightly in order to minimize surface tension effects. Equilibrate for one hour at 25° C., or a lower temperature in case of a low melting gel, and then apply a heating regime of 0.05° C./min. The gel melting point is the temperature at which the ball begins to sink through the sample. Movement of the ball can be observed using a travelling microscope.

Generally the above procedures for measuring the gel melting and gel setting temperature will produce different temperatures. If, however, the cooling and heating procedure as described above were carried out at an extremely low rate of temperature change, the gel setting and gel melting temperature would be found to be identical.

As the fat content is lowered crystallization becomes more critical as fewer crystals are available to stabilize more oil-water surface area. If the crystallization rate is very high, for instance due to the presence of a rapidly crystallizing seeding component, the process becomes difficult to control, requiring a high throughput. As the concentration of seeding component is reduced, more intense cooling is required to induce crystallization and to produce a stable product with relatively small droplets.

Although we do not wish to be bound by theory, we assume that in fat-continuous dispersions, the product is stabilized, inter alia, by fat crystals at the fat-water interface. It is indeed known in the art that fat crystals may stabilize water-in-oil dispersion via the so called Pickering-stabilization.

If the fat phase composition tends to crystallize very fast, for instance due to the absence of a seeding component or due to the presence of a rapidly crystallizing seeding component, relatively large fat crystals are formed resulting in relatively few stabilizing fat crystals being present at the oil-water interface. Thus less stable products are obtained, or in the worst case no fat continuous dispersion can be obtained at all.

We furthermore believe that very rapid crystallization may result in the formation of fat crystals at a very early processing stage. Working of the product at a later stage of the process may lead to removal of the crystals from the oil-water interface. The relatively large fat crystals removed from the oil-water interface will not easily return to said interface and therefore the stability of the dispersion will be adversely affected.

In the preparation of the present dispersions more control of crystallization can be obtained by additionally including a dissolved surface active component. An example of a suitable dissolved surface active component is a relatively low melting mono- or di-glyceride composition. The function of the surface active component is to reduce the crystal growth rate during cooling by its interaction with the interface between fat crystals and liquid oil. Preferably the present dispersion contains from 0.01 to 0.5 wt.% of a dissolved surface active component selected from the group consisting of monoglycerides, diglycerides and mixtures thereof.

The fat phase of the present dispersion is characterized by an $N_{20}$-value of at least 5, preferably in the range of 7-55. Preferably the fat phase of the present dispersion has an $N_{20}$-value in the range of 10-50 and an $N_{35}$-value of less than 10. The N-value for a fat or a fat phase composition at a certain temperature t is indicated as $N_t$ and indicates the equilibrium solid fat content of the composition at that temperature t, expressed in % of the weight of that composition. It can conveniently be measured by means of NMR, as described in Fette, Seifen, Anstrichmittel 80 (1978), 180-86.

In a preferred embodiment of the present invention essentially all the water in the dispersion is present in the form of a discontinuous dispersed aqueous phase. Spreads comprising a discontinuous dispersed aqueous phase offer the advantage that they combine an extremely low fat content with a high microbiological stability. The latter is a consequence of the fact that the spreads according to the invention comprise a continuous fat phase and a dispersed aqueous phase.

Aqueous phases used in low fat spreads frequently contain ingredients such as proteins and polysaccharides which serve as substrates for micro-organisms. Aqueous phases comprising such ingredients are therefore prone to microbiological infection. If, however, the aqueous phase is a dispersed phase, microbiological infection of aqueous phase droplets will not readily affect the rest of the product, because of the fat barriers present between the aqueous phase droplets. Thus, spreads comprising a dispersed aqueous phase are microbiologically more stable than products containing a continuous aqueous phase.

Whether or not a product comprises a continuous fat phase and a dispersed aqueous phase, i.e. no continuous aqueous phase, may be established by various methods. A very reliable and easy method is to measure the conductivity of the product using two plates separated by 1 cm. Preferably the present emulsion is characterized by a relatively low electric conductivity, e.g. less than 500 μS/cm. More characteristic than the degree of conductivity is the ratio of the conductivity of the aqueous phase and the conductivity of the emulsion. Preferably said ratio is above 10, indicating that the product is clearly water-continuous. According to a very preferred embodiment of the invention the latter ratio is above 100.

Provided the water droplets are relatively small, stable products according to the present invention can be obtained even if the aqueous phase comprises essentially no thickening and/or gelling agent. Preferably, however, the present dispersion comprises as the aqueous phase a gel-forming composition. The application of such a gelling aqueous phase enables the preparation of a stable dispersion comprising relatively large aqueous phase droplets. Such large aqueous phase droplets in general display a better flavour release than relatively small aqueous phase droplets. Preferably the aqueous phase of the present dispersion is a dispersed discontinuous aqueous phase having a number weighted mean droplet-size in the range of from 3 to 20 microns. The number weighted mean droplet-size is determined by means of NMR according to the method described in J. Colloid and Interface Science (1972) 10, 206 and (1983), 93, 521, using a log-normal distribution as is commonly employed for particle size analysis.

The present invention also encompasses dispersions comprising dispersed fat in addition to the fat present as the continuous fat phase. Such products are of the so called oil-in-water-in-oil type. It is known in the art that such products may have an improved oral response when compared with products of identical composition but having all fat present as a continuous fat phase.

In a preferred embodiment, however, the present dispersion contains at most only a very limited amount of dispersed fat. Furthermore the bulk of the present dispersion preferably consists of oil and water. Thus the present dispersion suitably comprises less than 14% by weight of fat and at least 80 wt.% of fat and water. In yet another preferred embodiment the present dispersion comprises 6 to 12% by weight of a continuous fat phase.

Particularly stable products are obtained when the dispersion comprises from 0.5 to 12% by weight of the fat phase of monoglycerides. The application of monoglycerides at such concentration levels also facilitates the preparation of the present dispersion since it allows processing conditions to be less critical. Preferably the fat phase of the present dispersion comprises 1-10% by weight of monoglycerides.

Another aspect of the present invention is a method of preparing a dispersion comprising 95 to 86% of an aqueous phase and 5 to 14% by weight of a continuous fat phase having an $N_{20}$-value of at least 5, said method comprising cooling and working an emulsion of oil and water, the oil comprising 0.1-4%, by weight of the oil, of a solid seeding component.

In a preferred embodiment of the present invention, upon cooling, the bulk of liquid triglycerides present in the emulsion is crystallized directly into a higher melting polymorph than the alpha-polymorph.

When applying a gelling aqueous phase in the present process, we have found it advantageous to control gelation so as to ensure that part of the gelation takes place before mixing the aqueous phase into the fat or before phase inversion to a fat-continuous dispersion is achieved. Accordingly, yet another aspect of the invention is concerned with a method of preparing a dispersion comprising 95 to 86% of an aqueous phase and 5 to 14% by weight of a continuous fat phase having an $N_{20}$-value of at least 5, said method comprising cooling a gelling agent containing water-continuous composition to a temperature below the gel setting temperature for a sufficiently long period of time to allow the formation of a gel structure, subjecting said water-continuous composition to shear so as to convert it into small gelled aqueous beads and forming a fat-continuous dispersion.

The above process is found particularly advantageous if the gelling agent utilized is slowly gelling, e.g. gelatin. Moreover the process can succesfully be carried out without using a seeding component, yielding stable dispersions producing an exceptionally good oral response. Thus, preferably the present fat phase does contain essentially no seeding component. It is observed that the fact that a seeding component is absent does not, for instance, mean that the fat phase cannot contain a relatively high melting monoglyceride. If such a relatively high melting monoglyceride is present at such a low concentration level that it completely dissolves into the fat phase, said monoglyceride will not crystallize prior to the bulk of the triglycerides and therefore does not act as a seeding component.

EXAMPLE 1

An edible plastified dispersion containing 7% by weight of a continuous fat phase and 93% by weight of a dispersed aqueous phase, employing the following compositions:

|  | Parts |
| --- | --- |
| Fat phase |  |
| Soybean oil | 45 |
| Coconut oil | 12 |
| Soybean oil hardened to 44° C. | 15 |
| Interesterified blend of coconut oil and soybean oil hardened to 41° C. (33:67) | 18 |
| Hymono 7804 TM (1) | 10 |
| Aqueous phase |  |
| Kappa-carrageenan | 1 |
| Sodium chloride | 1.8 |
| pH adjusted to 5.2 with lactic acid |  |
| Water | 97 |

(1) Monoglyceride composition, slip melting point about 40° C., ex. Quest, the Netherlands A dispersion was prepared from the above compositions at lab scale by feeding 93 parts of the aqueous phase and 7 part of the fat phase, after both phases have been heated to 60° C., to a series of 2 stirred crystallizers (C-units), provided with a cooling jacket. Both C-units were operated at 1400 rpm. The jacket temperature of each C-unit was about 5° C. The product left the first C-unit having a temperature of about 12° C. and the second C-unit having a temperature of 12° C. The water-in-oil dispersion thus obtained was stable and easy spreadable. No water-loss on spreading was observed.

EXAMPLE 2

Example 1 was repeated with the exception that 90 parts of the aqueous phase were mixed with 10 part of a fat phase which was identical to the fat phase of Example 1 but for the presence of 5 parts of Hymono 7804 TM.

The product obtained was fat-continuous and easy spreadable. Again no water-loss was observed on spreading.

EXAMPLES 3-5

Edible plastified dispersions containing a continuous fat phase and a dispersed aqueous phase were prepared from the following compositions:

|  | Parts |
| --- | --- |
| Fat phase |  |
| Rapeseed oil | 44 |
| Rapeseed oil hardened to 32° C. | 34 |
| Palm oil | 19 |
| Hymono 7804 TM | 3 |
| Aqueous phase |  |
| Kappa-carrageenan | 1 |
| Sodium chloride | 1.8 |
| pH adjusted to 5.2 with lactic acid |  |
| Water | 97.2 |

A dispersion was prepared from the above compositions at lab scale by feeding the separately prepared aqueous phase and fat phase, after both phases have been heated to 65° C., to a sequence consisting of a C-unit followed by an A-unit and another C-unit. Phase-inversion of a water-continuous dispersion to a fat-continuous dispersion was observed in the second C-unit. The throughput employed was around 50 g/minute while the processing conditions in the processing units were as follows:

| Unit | Shaft speed (rpm) | Jacket temp. (°C.) | Exit temp. (°C.) |
| --- | --- | --- | --- |
| First C-unit | 1000 | 45 | 45 |
| A-unit | 1400 | 11 | 15 |
| Second C-unit | 1400 | 3 | 12 |

The weight ratio in which the aqueous phase and fat phase are combined in the first C-unit was step-wise reduced, so as to produce three products of different fat content. The products obtained were analyzed, yielding the following results:

|  | Spread 3 | Spread 4 | Spread 5 |
| --- | --- | --- | --- |
| Fat content | 13.2 wt. % | 12.2 wt. % | 10.1 wt. % |
| Hardness $C_5$ | 140 g/cm$^2$ | 140 g/cm$^2$ | <140 g/cm$^2$ |
| Hardness $C_{15}$ | <115 g/cm$^2$ | <85 g/cm$^2$ | <145 g/cm$^2$ |
| Conductivity (15° C.) | 14 μS/cm | 11 μS/cm | 15 μS/cm |
| Mean dropsize [1] | 9 microns | 11 microns | 15 microns |
| Variance dropsize | 1.20 | 1.45 | 1.5 |

[1] Volume weighted mean droplet-size as measured by means of NMR

All spreads were true water-in-oil dispersions, stable on storage and easy spreadable. Spreads 4 and 5 showed some loss of water on spreading.

EXAMPLES 6 and 7

Examples 3-5 were repeated using a fat phase in which the monoglyceride content was increased relative to the other fat ingredients to a level of 5% by weight of the fat phase. Two spread products of different fat content were thus prepared.

|  | Spread 6 | Spread 7 |
| --- | --- | --- |
| Fat content | 12.7 wt. % | 9.1 wt. % |
| Hardness $C_5$ | 165 g/cm$^2$ | <120 g/cm$^2$ |
| Hardness $C_{15}$ |  | <120 g/cm$^2$ |
| Conductivity (15° C.) | 0.043 μS/cm | 31 μS/cm |
| Mean dropsize | 6 microns | 9 microns |
| Variance dropsize | 0.60 | 1.50 |

Both spreads were stable on storage and easy spreadable. Spread B showed some loss of water on spreading.

EXAMPLE 8-10

Edible plastified dispersions containing a continuous fat phase and a dispersed aqueous phase were prepared from the following compositions (in parts):

| Aqueous phase | | | |
|---|---|---|---|
| Kappa-carrageenan | | | 1.5 |
| Sodium chloride | | | 1.8 |
| pH adjusted to 5.2 with lactic acid | | | |
| Water | | | 96.7 |
| Fat phase | 8 | 9 | 10 |
| Fat blend | 97.0 | 96.0 | 95.0 |
| Hymono 7804 TM | 3.0 | 4.0 | 5.0 |

Wherein the fat blend had the following composition: Rapeseed oil (45 wt.%), rapeseed oil hardened to 32° C. (35 wt.%) and palm oil (20 wt.%).

The aqueous phase and fat phase were maintained at 70° C. in separate vessels and fed from there to a sequence consisting of a C-unit followed by an A-unit and another C-unit. The processing conditions employed in these units were as follows:

| Unit | Shaft speed (rpm) | Jacket temp. (°C.) | Exit temp. (°C.) |
|---|---|---|---|
| First C-unit | 1000 | 45 | 45 |
| A-unit | 1400 | 30 | 33 |
| Second C-unit | 1400 | −5 | 10 |

Using fat phase 8, 9 and 10 spreads of different fat content were prepared. Through analysis of these products the following results were obtained:

| | Fat phase 8 | | Fat phase 9 | | Fat phase 10 | |
|---|---|---|---|---|---|---|
| | A | B | A | B | A | B |
| Fat level | 13.1 | 11.2 | 12.1 | 9.1 | 11.9 | 9.6 |
| Hardness $C_5$ | 170 | 130 | 180 | 130 | 220 | 140 |
| Hardness $C_{15}$ | 105 | 100 | 125 | 110 | 125 | 105 |
| Conduct. (15° C.) | 20 | 150 | 0.47 | 71 | 0.08 | 0.89 |
| Mean dropsize | 9 | 14 | 6 | 8 | 6 | 8 |
| Variance | 1.20 | 1.25 | 0.90 | 1.65 | 0.50 | 0.70 |

As can be deduced from the above data all products were water-in-oil dispersions. Moreover all products were found to be stable on storage and easy spreadable. Only products 8B and 9B showed some loss of water on spreading.

EXAMPLES 11 and 12

Example 8 was repeated using a fat phase having the same fat phase composition with the exception that the fat phase in addition to 3.0 wt.% Hymono 7804 TM contained 1.0 wt.%, respectively 2.0 wt.% Bolec ZTD TM (lecithin ex Loders Croklaan, Wormerveer, the Netherlands).

The exact processing conditions employed were as follows:

| Unit | Shaft speed (rpm) | Jacket temp. (°C.) | Exit temp. (°C.) |
|---|---|---|---|
| First C-unit | 1000 | 45 | 45 |
| A-unit | 1400 | 30 | 33 |
| Second C-unit | 1400 | −5 | 16 |

The analysis of the two spreads obtained gave the following results:

| | Spread 11 | Spread 12 |
|---|---|---|
| Fat content | 13.3 wt. % | 13.0 wt. % |
| Hardness $C_5$ | 180 g/cm$^2$ | 170 g/cm$^2$ |
| Hardness $C_{15}$ | 140 g/cm$^2$ | 100 g/cm$^2$ |
| Conductivity (15° C.) | 6.5 μS/cm | 65 μS/cm |
| Mean dropsize | 6 microns | 7 microns |
| Variance dropsize | 1.3 | 1.45 |

Both products were fat-continuous and easily spreadable with no water loss on spreading.

EXAMPLE 13

Example 10 was repeated using a fat blend of different composition and slightly different processing conditions (at the same throughput).

The fat blend used had the following composition:

| Fat blend | % by weight |
|---|---|
| Soybean oil | 55 |
| Coconut oil | 12 |
| Soybean oil hardened to 41° C. | 15 |
| Interesterified blend of coconut oil and soybean oil hardened to 41° C. (33:60) | 18 |

The processing conditions applied were as follows:

| Unit | Shaft speed (rpm) | Jacket temp. (°C.) | Exit temp. (°C.) |
|---|---|---|---|
| First C-unit | 1000 | 45 | 45 |
| A-unit | 1400 | 25 | 33 |
| Second C-unit | 1400 | 5 | 18 |

The analysis of the spread so obtained gave the following results:

| | Spread 13 |
|---|---|
| Fat content | 10.7 wt. % |
| Hardness $C_5$ | 220 g/cm$^2$ |
| Hardness $C_{15}$ | 110 g/cm$^2$ |
| Conductivity (15° C.) | 11 μS/cm |
| Mean dropsize | 6 microns |
| Variance dropsize | 1.15 |

The product was fat-continuous and easily spreadable with no water loss on spreading.

EXAMPLE 14

An edible plastified dispersion containing a continuous fat phase and a dispersed aqueous phase was prepared from the following compositions:

| | Parts |
|---|---|
| Fat phase | |
| Rapeseed oil | 43 |
| Rapeseed oil hardened to 32° C. | 33 |
| Palm oil | 19 |
| Hymono 7804 TM | 5 |
| Aqueous phase | |
| Sodium chloride | 1.8 |
| Potassium sorbate | 0.2 |
| pH adjusted to 5.2 with lactic acid | |
| Water | 98.0 |

A dispersion was prepared from the above compositions at lab scale by feeding the separately prepared aqueous phase and fat phase, after both phases have been heated to 65° C., to a sequence consisting of an A-unit followed by a C-unit, an A-unit and another C-unit. Phase-inversion of a water-continuous dispersion to a fat-continuous dispersion was observed in the second C-unit. The throughput employed was around 50 g/minute while the exit temperatures from the processing units were as follows:

| Unit | Shaft speed (rpm) | Jacket temp. (° C.) | Exit temp. (° C.) |
| --- | --- | --- | --- |
| First A-unit | 1400 | 5 | 13 |
| First C-unit | 1400 | 8 | 12 |
| Second A-unit | 1400 | 8 | 13 |
| Second C-unit | 1400 | 8 | 15 |

The product obtained was a water-in-oil dispersion containing 13 wt.% fat which was easily spreadable. The product did not show water loss on spreading.

EXAMPLES 15 and 16

Edible plastified dispersions containing a continuous fat phase and a dispersed aqueous phase were prepared from the following compositions (in parts):

| Fat phase | | |
| --- | --- | --- |
| Soybean oil | 49 | |
| Coconut oil | 13 | |
| Soybean oil hardened to 41° C. | 17 | |
| Interesterified blend of coconut oil and soybean oil hardened to 41° C. (33:60) | 20 | |
| Hymono 4404 TM (1) | 1.5 | |
| Aqueous phase | 15 | 16 |
| Gelatin | 5.0 | 5.0 |
| Ultratex 2 TM | | 2.25 |
| Sodium chloride | 1.4 | 1.4 |
| Potassium sorbate | 0.2 | 0.2 |
| pH adjusted to 5.2 with lactic acid | | |
| Water | 93.4 | 91.15 |

(1) Monoglyceride composition, slip melting point about 55° C., ex. Quest, the Netherlands A dispersion was prepared from the above compositions at lab scale (25 g/minute) by feeding the separately prepared aqueous phase and fat phase, after both phases have been maintained at 50° C., to a sequence consisting of a C-unit followed by two A-units, and another two C-units. The processing conditions employed in the processing units were as follows:

| Unit | Shaft speed (rpm) | Jacket temp. (°C.) | Exit temp. (°C.) |
| --- | --- | --- | --- |
| First C-unit | 1000 | 45 | 45 |
| First A-unit | 1250 | 5 | 9 |
| Second A-unit | 1250 | 5 | 9 |
| Second C-unit | 600 | 5 | 8 |
| Third C-unit | 1000 | 20 | 20 |

The products obtained were analyzed, yielding the following results:

| | Spread 15 | Spread 16 |
| --- | --- | --- |
| Fat content | 14 wt. % | 11 wt. % |
| Hardness $C_5$ | 410 g/cm$^2$ | 330 g/cm$^2$ |
| Hardness $C_{15}$ | 150 g/cm$^2$ | 135 g/cm$^2$ |
| Conductivity (15° C.) | 30 μS/cm | 5 μS/cm |
| Mean dropsize | 108 microns | 120 microns |
| Variance dropsize | 1.05 | 0.65 |

The above spreads were fat-continuous and spread without loss of water being observed.

I claim:

1. Method of preparing a dispersion comprising 94 to 88% of an aqueous phase and 6 to 12% by weight of a continuous fat phase having an $N_{20}$-value of at least 5, said method comprising cooling and working an emulsion of oil and water, the oil comprising 0.1 to 4% by weight of the oil of a solid seeding monoglyceride or diglyceride component.

2. Method according to claim 1, wherein, upon cooling, the bulk of liquid triglycerides present in the emulsion is crystallized directly into the beta, beta prime or beta and beta prime polymorph.

* * * * *